United States Patent [19]

Chen

[11] Patent Number: 5,548,501
[45] Date of Patent: Aug. 20, 1996

[54] HIGH–VOLTAGE POWER SUPPLY CIRCUIT WITH A VOLTAGE DISCHARGING CIRCUIT

[75] Inventor: Pin-Yi Chen, Taipei, Taiwan

[73] Assignee: Extech Electronics Co., Ltd, Taiwan

[21] Appl. No.: 504,262

[22] Filed: Jul. 19, 1995

[51] Int. Cl.$^6$ .................................................. H02M 3/335
[52] U.S. Cl. ................... 363/21; 363/40; 363/97
[58] Field of Search .............................. 363/19, 20, 21, 363/39, 40, 97

[56] References Cited

U.S. PATENT DOCUMENTS

| | | | |
|---|---|---|---|
| 3,883,826 | 5/1975 | Kirby | 331/141 |
| 5,170,333 | 12/1992 | Niwayama | 363/21 |
| 5,175,675 | 12/1992 | Uramoto | 363/19 |
| 5,220,492 | 6/1993 | Rubin et al. | 363/21 |
| 5,325,282 | 6/1994 | Bansard | 363/21 |

*Primary Examiner*—Peter S. Wong
*Assistant Examiner*—Bao Q. Vu
*Attorney, Agent, or Firm*—Bacon & Thomas

[57] ABSTRACT

A high-voltage power supply circuit consisting of an amplifier, a sine wave generating circuit, an AC/DC converter, a microcontroller, a transformer, a rectifier diode, a filter capacitor, a first switch, and a second switch, in which the execution of the control program of the microcontroller controls the setting of the frequency of the sine wave signal, the start of the sine wave signal, the end of the sine wave signal, and the opening or closing of the relay switches; in which the sine wave signal from the sine wave generating circuit is amplified by an amplifier, boosted by a transformer, then rectified by a rectifier diode, and then filtered by a filter capacitor for output, or for feeding back to a negative terminal of the amplifier for comparison with the voltage at its positive terminal so as to stabilize the output voltage; and in which the execution of the control program of the microcontroller can also control the filter capacitor to discharge the voltage and the transformer to prevent damage to the switches.

2 Claims, 3 Drawing Sheets

5,548,501

HIGH-VOLTAGE POWER SUPPLY CIRCUIT WITH A VOLTAGE DISCHARGING CIRCUIT

BACKGROUND OF THE INVENTION

The present invention relates to a high-voltage power supply circuit with a voltage discharging loop in which the execution of the control program of the microcontroller controls the setting of the frequency of the sine wave signal, the start of the sine wave signal, the end of the sine wave signal, and the opening or closing of the relay switches; in which the sine wave signal from the sine wave generating circuit is amplified by an amplifier, boosted by a transformer, rectified by a rectifier diode, and then filtered by a filter capacitor for output, or for feeding back to a negative terminal of the amplifier for comparison with the voltage at its positive terminal so as to stabilize the output voltage; and in which the execution of the control program of the microcontroller can also control the filter capacitor to discharge the voltage and the transformer to prevent damage to the switches.

FIG. 3 shows a DC high-voltage generating circuit according to the prior art. As illustrated, the input terminal of the self-coupled transformer T1 is connected to an AC power supply. The output terminal of the transformer T1 is connected to the primary side of the transformer T2 through a switch SW1. The secondary side of the transformer T2 is connected to the positive terminal of a rectifier diode D. The negative terminal of the rectifier diode D is connected to the positive terminal thereof by a switch SW3 and also connected to a filter capacitor C through another switch SW4. The output terminal of the DC high-voltage generating circuit is connected to a switch SW2. When the switches SW1 and SW4 are turned on, the transformer T2 is driven to boost the voltage from the self-coupled transformer T1, and to send the boosted voltage to the rectifier diode D for rectification and then to the filter capacitor C for filtration, and therefore a DC high-voltage is obtained from the filter capacitor C. The working frequency of this circuit can only be maintained within 50–60 Hz. The capacity of the filter capacitor C must be big enough to reduce ripple voltage. When the switches SW2 and SW4 are maintained on, the switches SW1 and SW3 are maintained off, and the filter capacitor C forms, with the switch SW2, a discharging loop to discharge the voltage from the filter capacitor C. However, because the switch SW2 bears the voltage from the filter capacitor C, the contacts of the switch SW2 tend to be damaged by the big volume of electric current passing through. Furthermore, this power supply circuit has no voltage feedback means for stabilizing and the voltage, the output voltage of the power supply circuit thus tends to vary with its input voltage.

SUMMARY OF THE INVENTION

The present invention has been accomplished to provide a high-voltage power supply circuit which eliminates the aforesaid drawbacks. It is one object of the present invention to provide a high-voltage power supply circuit which provides a sine wave signal of low distortion to increase the working frequency and the reaction speed. It is another object of the present invention to provide a high-voltage power supply circuit which is simple in structure and durable in use. According to the preferred embodiment of the present invention, the high-voltage power supply circuit is made up of an amplifier, a sine wave generating circuit, an AC/DC converter, a microcontroller, a transformer, a rectifier diode, a filter capacitor, a first switch, and a second switch, in which the execution of the control program of the microcontroller controls the setting of the frequency of the sine wave signal, the start of the sine wave signal, the end of the sine wave signal, and the opening or closing of the relay switches; in which the sine wave signal from the sine wave generating circuit is amplified by an amplifier, then boosted by a transformer, then rectified by a rectifier diode, and then filtered by a filter capacitor for output, or for feeding back to negative terminal of the amplifier for comparison with the voltage at its positive terminal so as to stabilize the output voltage; the and in which execution of the control program of the microcontroller can also control the filter capacitor to discharge the voltage and the transformer to prevent damage to the switches.

DETAILED DESCRIPTION OF THE PREFERRED EMBODIMENT

Figure 1:
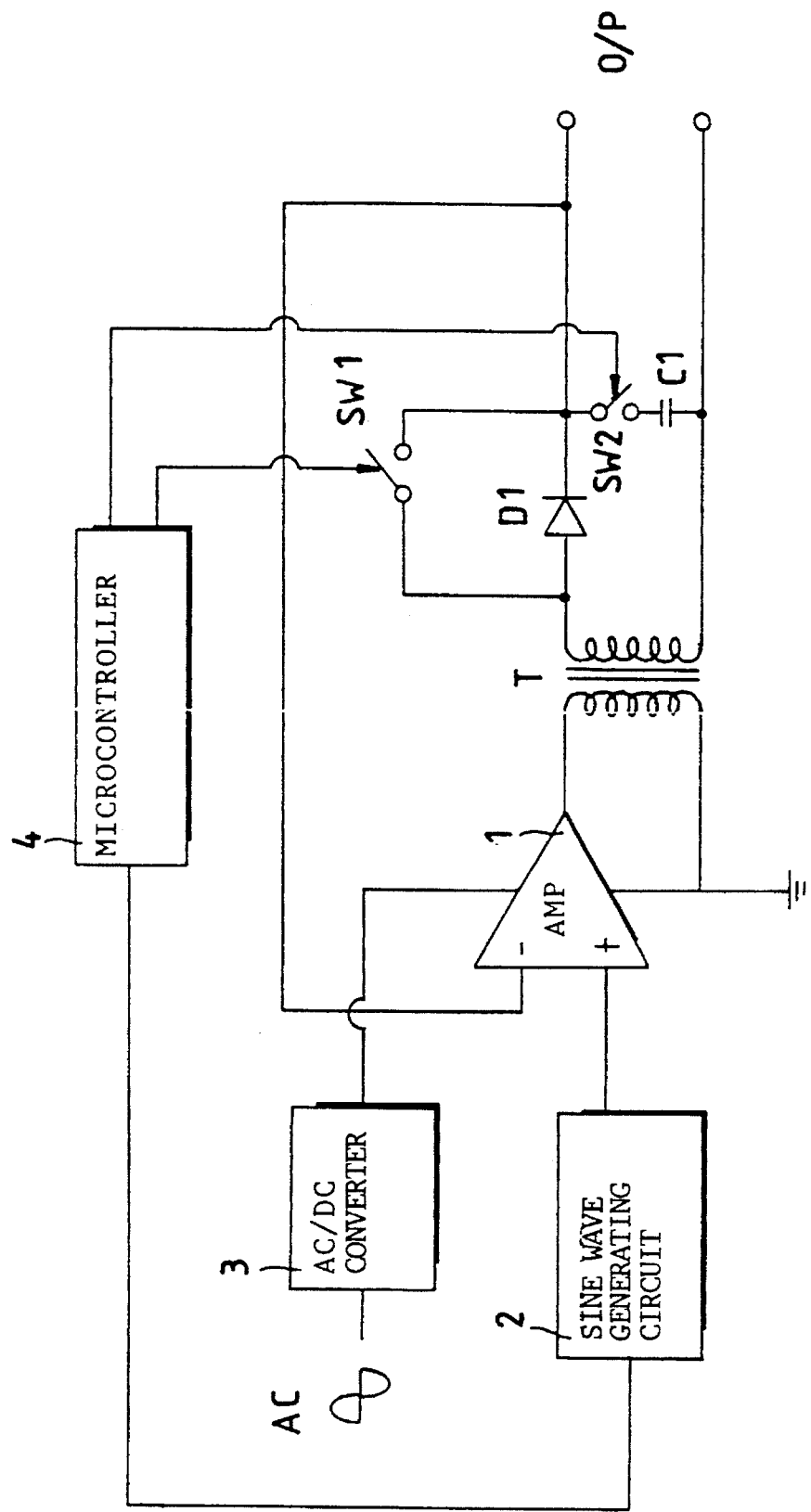
FIG. 1 is a circuit block diagram of a high-voltage power supply circuit according to the present invention.

Referring to FIG. 1, a high-voltage power supply circuit in accordance with the present invention is generally made up of an amplifier 1, a sine wave generating circuit 2, an AC/DC converter 3, a microcontroller 4, a first relay switch SW1, and a second relay switch SW2. The input terminal of the sine wave generating circuit 2 is connected to the microcontroller 4. The microcontroller 4 is respectively connected to the end contacts of the first relay switch SW1 and the second relay switch SW2. The sine wave generating circuit 2 is arranged to provide a sine wave signal of fixed amplitude and low distortion. The microcontroller 4 controls the sine wave signal generating circuit 2 to output or stop from outputting the sine wave signal and to regulate the frequency of the sine wave signal, and also controls the relay switches SW1 and SW2 to close or open. The output terminal of the sine wave generating circuit 2 is connected to the amplifier 1, which is connected to the AC/DC converter 3, which provides the necessary DC working voltage. The non-inverter terminal of the amplifier 1 is connected to the sine wave generating circuit 2, and the output terminal thereof is connected to the primary side of a transformer T. One contact of the secondary side of the transformer T is connected to the positive terminal of a rectifier diode D1. The inverter terminal of the amplifier 1 is connected to the negative terminal of the rectifier diode D1. The negative terminal of the rectifier diode D1 is connected to its positive terminal through the first relay switch SW1, and connected to one end of a filter capacitor C1 through the second relay switch SW2. The opposite end of the filter capacitor C1 is connected to another contact of the secondary side of the transformer T. When the first relay switch SW1 is turned off, the second relay switch SW2 is turned on, and the amplifier 1 amplifies the sine wave signal from the sine wave signal generating circuit 2 and then sends the amplified signal to the transformer T for boosting. The boosted voltage is then processed by the rectifier diode D1 and the filter capacitor C1 to provide a DC voltage, which is then fed back to the inverter terminal of the amplifier 1 for comparison with the voltage at the non-inverter terminal of the amplifier 1, and therefore the output voltage from the amplifier 1 is stabilized. At this stage, the set frequency of the sine wave signal is about 10–20 greater than over the frequency 50–60 Hz of AC power supply. Therefore, the cycle time of the sine wave signal is short, and the reaction speed is quick. On the other hand, when the first relay switch SW1 is turned on, the second relay switch is turned off, and the amplifier 1 amplifies the sine wave signal from the sine wave signal generating circuit 2 and then sends the amplified signal to the transformer T for boosting. At this stage, the set frequency of the sine wave signal is about equal to the frequency 50–60 Hz of AC power supply.

Figure 2:
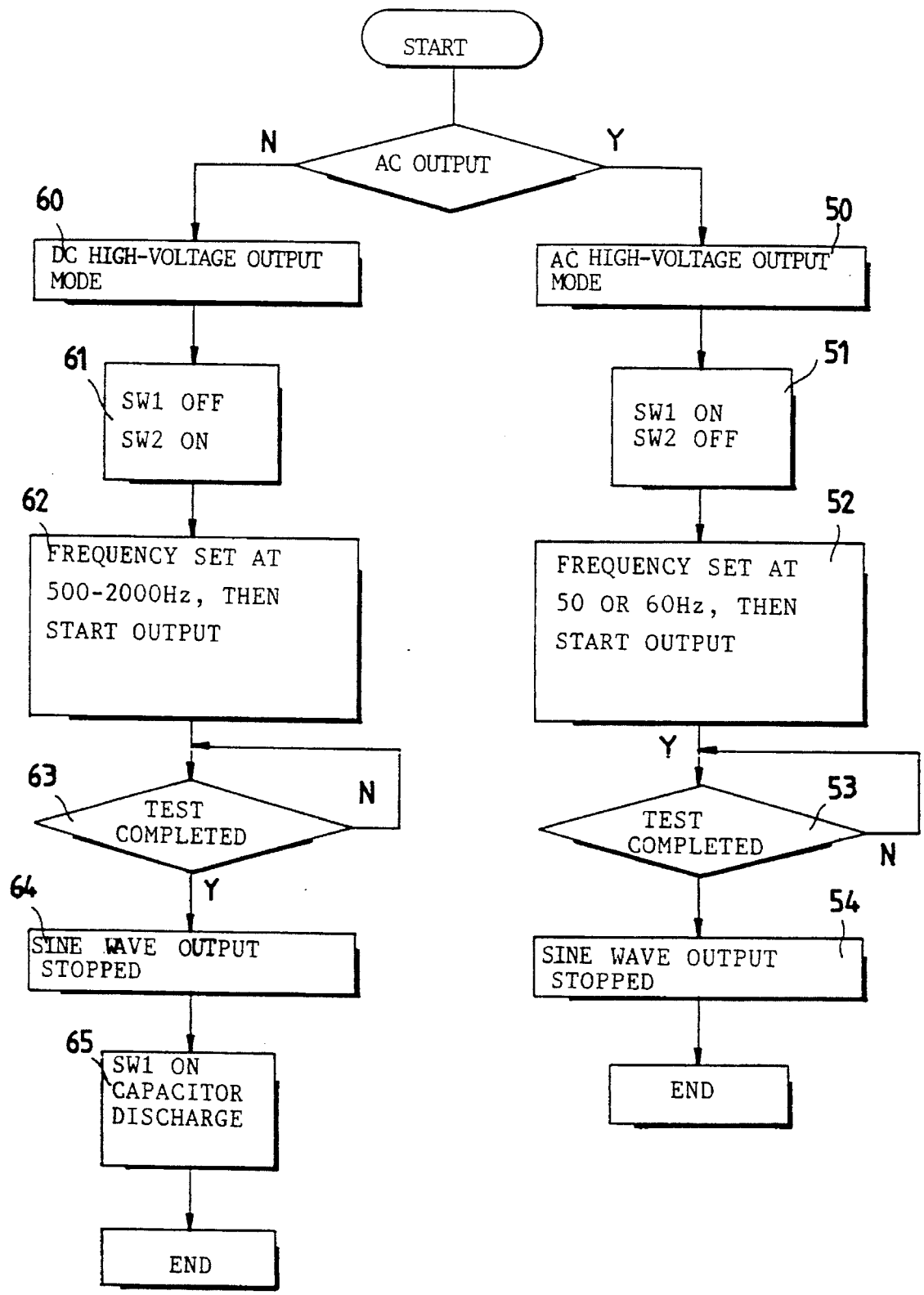
FIG. 2 is a flow chart showing the control flow of the microcontroller according to the present invention.
Figure 3:
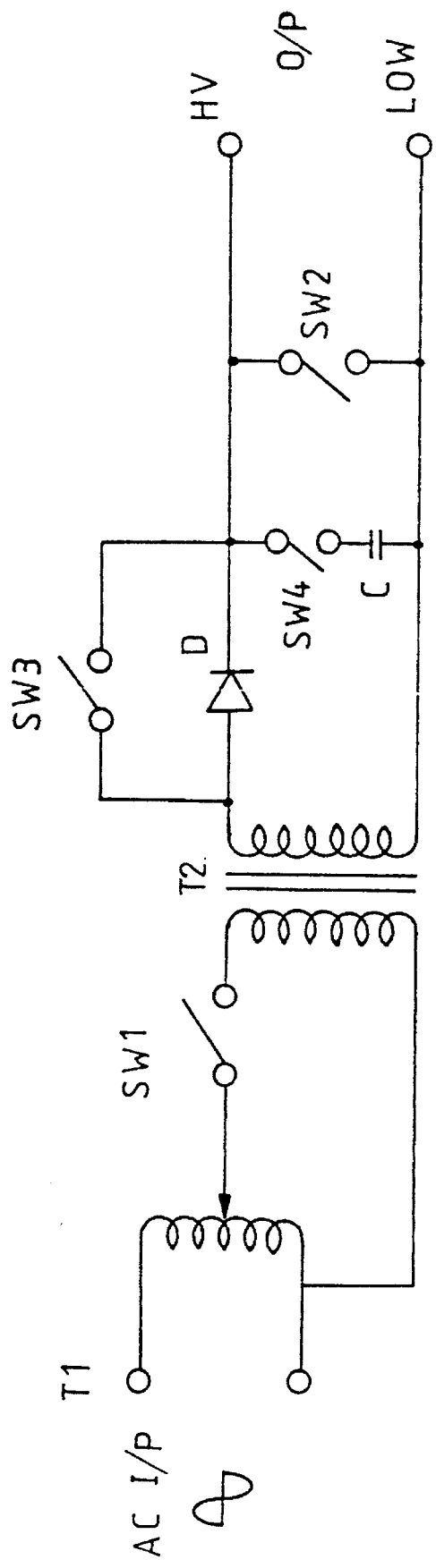
FIG. 3 is a circuit diagram of a regular DC high-voltage generating circuit.

Referring to FIG. 2, when an AC high-voltage output mode is selected (step 50), the microcontroller 4 is operated to turn on the first relay switch SW1 and turn off the second relay switch SW2 (step 51). At the same time the frequency of the sine wave signal is set at 50–60 Hz by the microcontroller 4 and the sine wave generating circuit 2 is driven by the microcontroller 4 to start outputting the sine wave signal (step 52). Then, the sine wave signal is amplified by the amplifier and boosted by the transformer T and the microprocessor detects the circuit to check if the test has been finished or not (step 53). If the test is finished, the output of the sine wave signal is stopped (step 54). If the test is not finished, the sine wave signal test is continued. When a DC high-voltage output mode is selected (step 60), the microcontroller 4 is operated to turn off the first relay switch SW1 and turn on the second relay switch SW2 (step 61). At the same time the frequency of the sine wave signal is set at 500–2000 Hz by the microcontroller and the sine wave generating circuit 2 is driven by the microcontroller 4 to start outputting the sine wave signal (step 62). Then the sine wave signal is amplified by the amplifier and boosted by the transformer, and the microprocessor detects the circuit to check if the test has been finished or not (step 63). If the test is finished, the output of the sine wave signal is stopped (step 64), and then the first relay switch SW1 is turned on. At this stage, the filter capacitor C1, the second relay switch SW2, the first relay switch SW1, and the transformer T form a discharging loop to discharge the voltage from the filter capacitor C1 through the secondary side of the transformer T (step 65). The capacity of the filter capacitor C1 is low, but the capacity of the inductance value measured at the secondary side of the transformer T is high. Therefore, the volume of current is small, and the contact points of the relay switches will not be damaged easily.

It is to be understood that the drawings are designed for purposes of illustration only, and are not intended as a definition of the limits and scope of the invention disclosed.

I claim:

1. A high-voltage power supply circuit comprising an amplifier, a sine wave generating circuit, an AC/DC converter, a microcontroller, a transformer, a rectifier diode, a filter capacitor, a first switch, and a second switch, wherein: said sine wave generating circuit is controlled by said microcontroller to provide a sine wave signal of fixed amplitude and low distortion; said microcontroller is connected to the input terminal of said sine wave generating circuit and bridged to a respective contact on said first switch and said second switch, and controlled to drive said sine wave generating circuit and to set the frequency of the sine wave signal from said sine wave generating circuit, and to turn on/off said first switch and said second switch; the non-inverter terminal of said amplifier is connected to said sine wave generating circuit, and the output terminal thereof is connected to the primary side of said transformer, the secondary side of said transformer having a contact connected to the positive terminal of said rectifier diode, the inverter terminal of said amplifier being connected to the negative terminal of said rectifier diode, the negative terminal of said rectifier diode being connected to its positive terminal through said first switch and simultaneously connected to one end of said filter capacitor through said second switch, the opposite end of said filter capacitor being connected to another contact at the secondary side of said transformer; said amplifier is controlled by said microprocessor to amplify the sine wave signal from said sine wave generating circuit; said microcontroller is controlled to turn on/off said first switch and said second switch; and said filter capacitor is driven to discharge through said transformer when said first switch is turned on and said second switch is turned off.

2. The high-voltage power supply circuit of claim 1 wherein said first switch and said second switch are relay switches.

\* \* \* \* \*

UNITED STATES PATENT AND TRADEMARK OFFICE
CERTIFICATE OF CORRECTION

PATENT NO. : 5,548,501
DATED : August 20, 1996
INVENTOR(S) : Pin-Yi Chen

It is certified that error appears in the above-identified patent and that said Letters Patent is hereby corrected as shown below:

<u>Column 4,</u>
Line 39, change "off" to -- on --.

Signed and Sealed this

Thirteenth Day of January, 2004

JON W. DUDAS
*Acting Director of the United States Patent and Trademark Office*